I. N. DOWNS.
Wagon-Brake.
No. 162,632.  Patented April 27, 1875.
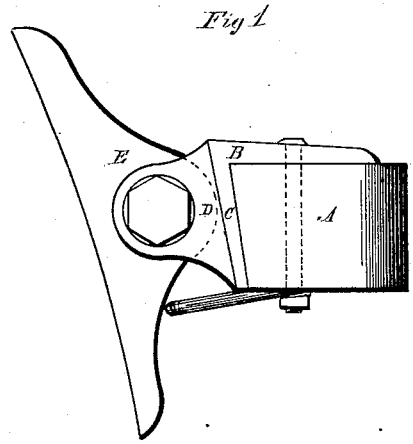
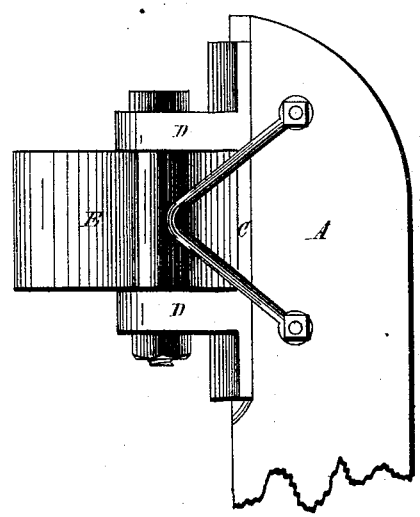
WITNESSES.
J. Wm Garner,
Chas. W. Lemon.
INVENTOR.
I. N. Downs
per F. A. Lehmann
Atty
THE GRAPHIC CO. PHOTO-LITH. 39 & 41 PARK PLACE, N.Y.

UNITED STATES PATENT OFFICE.

ISAAC N. DOWNS, OF WEST NEWTON, PENNSYLVANIA.

IMPROVEMENT IN WAGON-BRAKES.

Specification forming part of Letters Patent No. 162,632, dated April 27, 1875; application filed March 15, 1875.

*To all whom it may concern:*

Be it known that I, ISAAC N. DOWNS, of West Newton, in the county of Westmoreland and State of Pennsylvania, have invented certain new and useful Improvements in Wagon-Brakes; and I do hereby declare the following to be a full, clear, and exact description of the invention, such as will enable others skilled in the art to which it pertains to make and use it, reference being had to the accompanying drawings, which form part of this specification.

My invention relates to an improvement in wagon-brakes; and consists in a combination of parts, which will be more fully described hereafter.

The accompanying drawing represents my invention.

A represents a lock-bar of the usual form, which has secured upon its outer end an iron plate, B, with a flange, C, which flange extends downward, so as to cover the thickness of the brake-bar. Upon the flange C are two projections or ears, D, between which the metallic block or brake E is pivoted. This block or brake is of such a form that its face forms a segment of a circle to correspond with the shape of the wheel, and increases in thickness from both ends to the center, where its pivot-bolt passes through it. Secured to the under side of the bar A, by the same bolts that secure the plate B, is a V-shaped rod, which forms a stop to prevent the brake from turning too far downward, but allows the necessary freedom to bend down or up to accommodate itself to the wheel.

It is well known that wooden brakes, whether covered with leather or india-rubber, or not, soon wear out, and have to be renewed; but it is not so generally known that wooden brakes wear out the tires much faster than metallic or iron ones, for the reason that sand or gritty substances carried around upon the wheels become firmly embedded in the pores of the wood, and, when the brake is applied, cut and wear the tires the same as a grindstone. Metallic brakes, not holding any grit on their surface, do not wear away the tires as rapidly, and, when applied to the wheel, require but little pressure to become effective.

Having thus described my invention, I claim—

The combination of the bar A, plate B, flange C, ears D, metallic block or brake E, and V-shaped stop $d$, substantially as set forth.

In testimony that I claim the foregoing I have hereunto set my hand this 3d day of March, 1875.

ISAAC N. DOWNS.

Witnesses:
 GEORGE G. RICHIE,
 ALEXANDER M. DICK.